(12) United States Patent
Choi et al.

(10) Patent No.: US 9,175,612 B2
(45) Date of Patent: Nov. 3, 2015

(54) METHOD AND APPARATUS FOR CONTROLLING COMBUSTION OF ENGINE HAVING MIXED COMBUSTION MODE

(71) Applicant: Hyundai Motor Company, Seoul (KR)

(72) Inventors: Dae Choi, Whasung-Si (KR); Hyeung Woo Lee, Whasung-Si (KR); Hyun Sung Jung, Whasung-Si (KR); Yo Han Chi, Whasung-Si (KR); Seung Il Park, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/310,834

(22) Filed: Jun. 20, 2014

(65) Prior Publication Data

US 2015/0114354 A1 Apr. 30, 2015

(30) Foreign Application Priority Data

Oct. 29, 2013 (KR) ........................ 10-2013-0129089

(51) Int. Cl.
*F02D 15/00* (2006.01)
*F02D 19/06* (2006.01)

(52) U.S. Cl.
CPC ............ *F02D 15/00* (2013.01); *F02D 19/0649* (2013.01)

(58) Field of Classification Search
CPC ......... F02D 15/00; F02D 15/02; F02D 15/04; F02D 19/06; F02D 19/0639; F02D 19/0649; F02D 19/08; F02D 19/081; F02D 19/085; F02D 19/10; F02D 41/3011; F02D 41/3017; F02D 41/3094; F02B 75/04

USPC ..... 123/1 A, 3, 48 R, 575, 577; 701/103, 104
See application file for complete search history.

(56) References Cited

U.S. PATENT DOCUMENTS

| 7,588,019 B2 * | 9/2009 | Casal Kulzer ........... 123/568.14 |
| 7,698,051 B2 * | 4/2010 | Yasui ............................ 701/105 |
| 2011/0192379 A1 * | 8/2011 | Mayenburg ................. 123/48 B |

FOREIGN PATENT DOCUMENTS

| JP | 2000-110595 A | 4/2000 |
| JP | 2011-122529 A | 6/2011 |
| KR | 10-0575030 B1 | 5/2006 |
| KR | 10-2010-0062723 B1 | 6/2010 |
| KR | 10-2013-0068110 A | 6/2013 |

* cited by examiner

*Primary Examiner* — Lindsay Low
*Assistant Examiner* — Grant Moubry
(74) *Attorney, Agent, or Firm* — Morgan, Lewis & Bockius LLP

(57) ABSTRACT

A method of controlling combustion of an engine improves unstable ignition and knocking which may be generated in an engine to which a diesel-gasoline mixed combustion mode and a gasoline mixed combustion mode are applied to low load and high load driving zones. The method includes: determining a combustion mode according to a current driving state of the engine; determining a compression ratio corresponding to the combustion mode; controlling a variable compression ratio device to control a compression ratio of a cylinder; determining whether the combustion state of the engine obtained during the combustion after the control to the compression ratio satisfies a set condition; and performing a compression ratio compensation such that the combustion state of the engine satisfies the set condition with taking a combustion pressure sensor signal as a feedback signal when the set condition is not satisfied.

24 Claims, 3 Drawing Sheets

METHOD AND APPARATUS FOR CONTROLLING COMBUSTION OF ENGINE HAVING MIXED COMBUSTION MODE

CROSS-REFERENCE TO RELATED APPLICATION

The present application claims priority of Korean Patent Application Number 10-2013-0129089 filed Oct. 29, 2013, the entire contents of which application is incorporated herein for all purposes by this reference.

BACKGROUND OF INVENTION

1. Field of Invention

The present invention relates to a method of and an apparatus for controlling combustion of an engine, and more particularly to a method of and an apparatus for controlling combustion of an engine to improve unstable ignition and knocking which may be generated in an engine to which a diesel-gasoline mixed combustion mode and a gasoline mixed combustion mode are applied to low load and high load driving zones.

2. Description of Related Art

Today, two types of engines are widely used, one is a gasoline engine of a spark ignition (SI) type and the other is a diesel engine of a compression ignition (CI) type.

The SI type engine may be classified into an indirect injection type to inject fuel into a throttle body or an intake manifold and to intake the fuel with air at the intake stroke and a gasoline direct injection (GDI) type to inject fuel directly into a combustion chamber to burn for the improvement of engine performance and fuel ratio and the reduction of exhaust gas.

A port fuel injection (PFI) type engine, as an example of the indirection injection type engine, employs a premixed combustion in which a combustible mixture consisting of the fuel injected into the intake port of the intake manifold and air is introduced into the combustion chamber and is ignited and burnt by an ignition plug in a uniform mixture.

The GDI engine injects the gasoline fuel directly into the combustion chamber similar to in the CI diesel engine and thus lean burn is enabled and advantageous in view of engine performance, fuel ratio, and exhaust gas in comparison to the indirect injection type engine.

In general, the SI gasoline engine has a limit to increase a compression ratio (CR) because the higher risk knocking may occur the higher the CR is, and has poor thermal efficiency and fuel ratio than those of the CI engine.

In order to comply with the gradually strengthening regulations on $CO_2$ and meet the customer demands, it is necessary to increase the CR of an engine but it needs also a technology of preventing knocking from being generated at the increased CR.

In a high CR gasoline engine, knocking is restrained and pumping loss is reduced when an exhaust gas recirculation (EGR) device is applied to restrain the knocking, but the existing ignition plug cannot obtain good ignition or makes $NO_x$ increase.

Meanwhile, combustion property of the diesel engine is to employ the compression ignition using self-ignition property of diesel fuel and uses high compression ratio to make air in the combustion chamber high pressure and high temperature state, so that the diesel engine has superior thermal efficiency and fuel ratio than the gasoline engine.

In recent, as unexceptional climate changes such as global warming are reported all around the world, environmental regulations affect in many countries, especially advanced countries, more particularly in automobile industrial.

In order to meet the environmental regulation, many researches and developments for the compression ignition engine are being conducted due to the advantages such as a small quantity of unburned hydrocarbon (UHC) and $CO_2$. However, the CI engine discharges a great deal of $NO_x$ and particulate matters (PM) caused by a not-uniform air-fuel mixture and needs an expensive after-treatment device such as a diesel particulate filter (DPF) and a $DeNO_x$ for reduction of $NO_x$ and PM to meet the regulations.

To overcome the above-mentioned disadvantages, active researches and developments for a homogeneous charge compression ignition (HCCI) of making the mixture in the combustion chamber homogeneous to remove an area where a fuel is concentrated known as a PM generating area and of reduce drastic heat are carried out.

The HCCI is advantageous to improve fuel ratio through the compression ignition and lean burn in comparison to the gasoline engine and to reduce $PM/NO_x$ through the premixed combustion in comparison to the diesel engine.

However, the HCCI is disadvantageous in difficult control of ignition and burning and excessive pressure increase, burning noise, a low output and is known to have a problem of solving a narrow driving region (is limited to use only in a low speed and a low load driving region of an engine).

Thus, researches for a mixed combustion of burning diesel and gasoline at the same time to avoid the problem of the existing HCCI are carried out.

There is a method of burning a homogeneous fuel, as an example of the diesel-gasoline mixture combustion, in order to suppress knocking caused by the premixing and to control the ignition timing near the TDC by elongating the ignition delay period, by mixing gasoline with a high octane number in advance to make a homogeneous mixture within the combustion chamber during the intake stroke and by directly injecting diesel with a high cetane number for the compression ignition into the combustion chamber for the compression ignition during the compression stroke.

This diesel-gasoline mixture combustion enables to secure ignition of gasoline even under the high EGR condition in comparison to the existing HCCI and not point combustion but volumetric combustion to improve combustion efficiency and fuel ratio than those of the existing gasoline engine because self-ignited diesel acts as an ignition source for combustion of gasoline.

Moreover, the engine employing the diesel-gasoline mixture combustion reduces products of exhaust gas in comparison to the existing diesel engine and the expensive after-treatment device making price increase may be omitted.

However, since, in the diesel-gasoline mixture combustion engine, the mixture combustion is possible only under the condition where the diesel compression ignition may occur, the diesel-gasoline mixture combustion engine must be driven at a compression ratio lower than that of a diesel engine but higher than that of a gasoline engine and a compression ratio of a cylinder thereof is equal to or higher a boundary condition where the diesel compression ignition is secured.

Thus, the diesel-gasoline mixture combustion engine is disadvantageous than the existing diesel engine in view of securing the compression ignition due to the low compression ratio and the high EFG condition in the low load driving region, while possibility of knocking becomes higher than the existing gasoline engine because of the high compression ratio in the high load driving region.

Hence, in order to improve the above-mentioned problems over all driving regions, it needs to apply the diesel-gasoline mixture combustion at a compression ratio higher than that of the existing gasoline engine and lower than that of the existing diesel engine over the low/middle load engine driving regions.

Moreover, it needs a complex combustion mode system capable of utilizing the gasoline combustion to in which a compression ratio employed in a general gasoline engine is applied at the low load and the high load, and to this end concept of a variable compression ratio must be introduced.

In this case, it needs to secure the compression ignition in the region where the diesel-gasoline mixture combustion is applied and even in a region where the gasoline combustion occurs, and to prevent knocking from being generated by the gasoline combustion in the high load region.

To this end, it needs to distinguish combustion modes and to control the same, and a technology of solving the problem caused by the existing fixed compression ratio is needed.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to solve the above-described problems associated with prior art. Various aspects of the present invention provide for a method of and an apparatus for improving unstable ignition and knocking in an engine to which a diesel-gasoline mixture combustion is applied.

According to the combustion controlling method of the present invention, the combustion mode is selected according to the driving state a compression ratio corresponding to the selected combustion mode is changed so that knocking and abnormal ignition that may be generated in an engine having a diesel-gasoline mixture combustion mode and a gasoline combustion mode can be solved.

a method of controlling combustion of an engine having a mixture combustion mode where a mixture combustion of diesel and gasoline is carried out and a gasoline combustion mode where only gasoline is burnt including: determining a combustion mode according to a current driving state of the engine from the mixture combustion mode and the gasoline combustion mode; determining a compression ratio corresponding to a combustion mode according to the current driving state of the engine; controlling a variable compression ratio device to control a compression ratio of a cylinder to the determined compression ratio; determining whether the combustion state of the engine obtained during the combustion after the control to the compression ratio satisfies a set condition for securing a combustion stability; and performing a compression ratio compensation performed by the variable compression ratio device such that the combustion state of the engine satisfies the set condition with taking a combustion pressure sensor signal as a feedback signal when the set condition is not satisfied.

The determining of the combustion mode may include: detecting the current driving state of the engine; and determining a combustion mode corresponding to the current driving state of the engine using a combustion mode termination map in which combustion modes are distinguished according to driving states of the engine.

The current driving state of the engine may include an RPM and a load of the engine.

The variable compression ratio device may be controlled such that the compression ratio in the gasoline combustion mode is lower than that of the mixture combustion mode when the mixture combustion mode is switched to the gasoline combustion mode by determining the combustion mode according to the current driving state of the engine.

The variable compression ratio device may be controlled such that the compression ratio in the mixture combustion mode is greater than that of the gasoline combustion mode when the gasoline combustion mode is switched to the mixture combustion mode by determining the combustion mode according to the current driving state of the engine.

The compression ratio corresponding to a combustion mode may be determined to control by the map from engine driving state information including the RPM and the load of the engine.

A final control value of the compression ratio compensated to satisfy the set condition may be stored as a new map value corresponding to the current driving state of the engine such that a corrected map value is used after that.

The combustion state of the engine may include a coefficient of variation of indicated mean effective pressure (CoV (IMEP)) calculated from a combustion pressure measured by a combustion pressure sensor in real time and the set condition includes a condition where the CoV (IMEP) is less than a reference (X).

A compression ratio compensation of increasing the compression ratio may be carried out when the CoV (IMEP) is greater than the reference (X).

The driving state of the engine may further include a crank angle (CAMFB50%) of mass fraction burned (MFB) 50% obtained from the combustion pressure measured by the combustion pressure sensor and the set condition further includes a condition when the crank angle (CAMFB50%) is less than a reference (Y), wherein, the reference (Y) is set by an absolute value of from the reference (Y)=(CAMFB50% set value−a measured crank angle (CAMFB50%) obtained from the combustion pressure), and wherein the CAMFB50% set value includes a crank angle (CA) constant when a preset MFB50% occurs.

The driving state of the engine may further include a crank angle (CAMFB50%) of mass fraction burned (MFB) 50% obtained from the combustion pressure measured by the combustion pressure sensor and the set condition further includes a condition when the crank angle (CAMFB50%) is within a preset range.

A correction of increasing the compression ratio may be carried out when the crank angle (CAMFB50%) is greater than an upper limit of the set range, while a correction of lowering the compression ratio is carried out when the crank angle (CAMFB50%) is less than a lower limit of the preset range.

The mixture combustion mode may be a combustion mode where the gasoline is injected into an intake port to produce a premixture in which air and the gasoline are mixed with each other during an intake stroke and where diesel for compression ignition is injected into the premixture within a combustion chamber for the compression ignition during a compression stroke.

The gasoline combustion mode may be a spark ignition combustion mode where the gasoline is injected into an intake port to produce a premixture in which air and the gasoline are mixed with each other during an intake stroke and where the premixture is ignited by an ignition plug during an explosive stroke.

Various aspects of the present invention provide for an apparatus for controlling combustion of an engine having a mixture combustion mode where diesel and gasoline are mixed and burnt and a gasoline combustion mode where the gasoline only is burnt, the apparatus including: a controller determining a combustion mode from the mixture combustion mode and the gasoline combustion mode according to a current driving state of the engine and outputting a control signal for the control of a compression ratio corresponding to a combustion mode according to the current driving state of the engine; and a variable compression ratio device changing the compression ratio to a value corresponding to a corresponding combustion mode in response to the control signal from the controller; wherein the controller outputs a control signal to compensate the compression ratio with a combustion pressure sensor signal as a feedback signal when the combustion state of the engine obtained during the combustion after control to the compression ratio does not satisfy a preset condition of securing combustion stability.

The current driving state of the engine may include an RPM and a load of the engine which are determined by a detection signal from a driving state detector.

The controller may determine a value according to the current driving state of the engine including the RPM and the load of the engine from the map as a compression ratio corresponding to a combustion mode.

The combustion state of the engine may include a coefficient of variation of indicated mean effective pressure (CoV (IMEP)) calculated from a combustion pressure measured by a combustion pressure sensor in real time and the set condition includes a condition where the CoV (IMEP) is less than a reference (X).

A compression ratio compensation of increasing the compression ratio may be carried out when the CoV (IMEP) is greater than the reference (X).

The driving state of the engine may further include a crank angle (CAMFB50%) of mass fraction burned (MFB) 50% obtained from the combustion pressure measured by the combustion pressure sensor and the set condition further includes a condition when the crank angle (CAMFB50%) is less than a reference (Y), wherein, the reference (Y) is set by an absolute value of from the reference (Y)=(CAMFB50% set value−a measured crank angle (CAMFB50%) obtained from the combustion pressure), and wherein the CAMFB50% set value includes a crank angle (CA) constant when a preset MFB50% occurs.

The driving state of the engine may further include a crank angle (CAMFB50%) of mass fraction burned (MFB) 50% obtained from the combustion pressure measured by the combustion pressure sensor and the set condition further includes a condition when the crank angle (CAMFB50%) is within a preset range.

The controller may output a control signal for a correction of increasing the compression ratio is carried out when the crank angle (CAMFB50%) is greater than an upper limit of the set range and a control signal for a correction of lowering the compression ratio is carried out when the crank angle (CAMFB50%) is less than a lower limit of the preset range.

The mixture combustion mode may be a combustion mode where the gasoline is injected into an intake port to produce a premixture in which air and the gasoline are mixed with each other during an intake stroke and where diesel for compression ignition is injected into the premixture within a combustion chamber for the compression ignition during a compression stroke.

The gasoline combustion mode may be a spark ignition combustion mode where the gasoline is injected into an intake port to produce a premixture in which air and the gasoline are mixed with each other during an intake stroke and where the premixture is ignited by an ignition plug during an explosive stroke.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
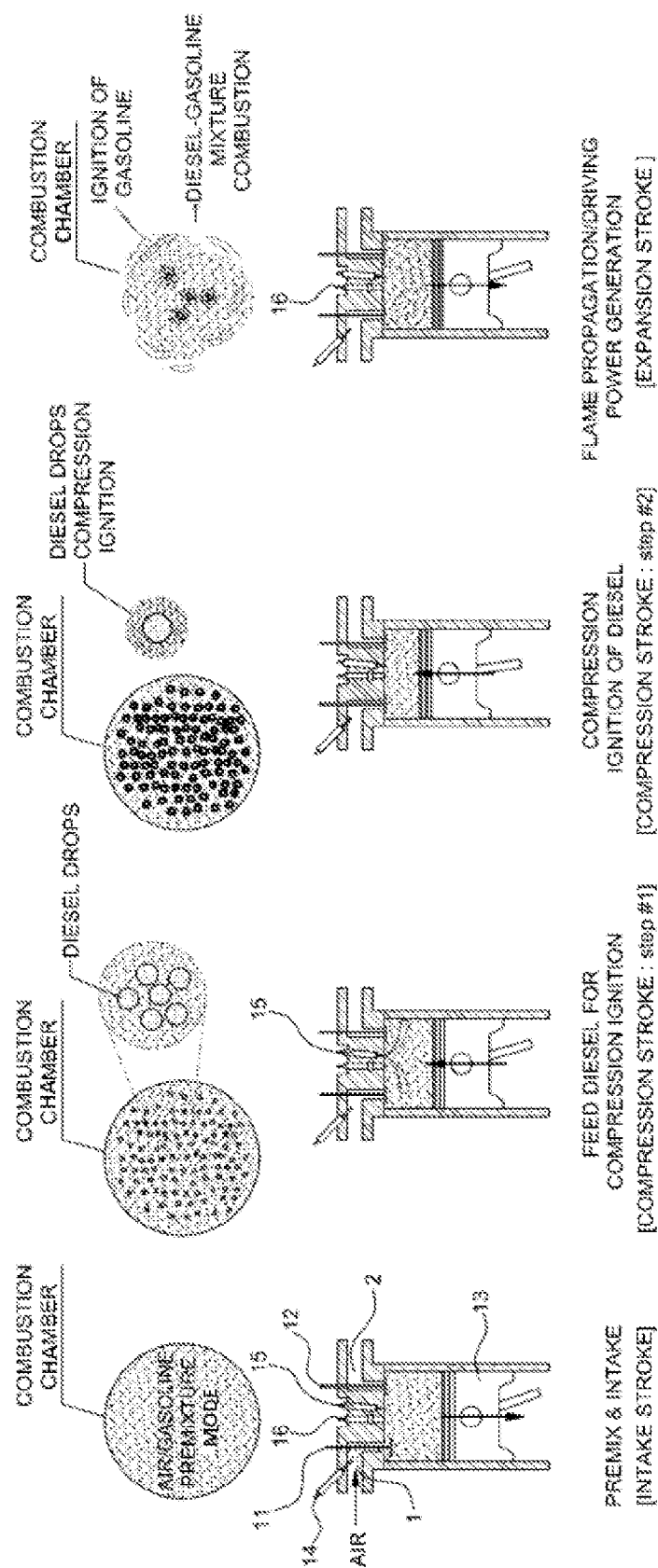
FIG. 1 is a view illustrating an exemplary engine having a diesel-gasoline mixture combustion mode and a combustion cycle in the diesel-gasoline mixture combustion mode.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various aspects of the present invention have been made to improve problems of the existing diesel-gasoline mixture combustion engine, especially, the unstable ignition in the low load driving region and the knocking in the high load driving region, has a mixture combustion mode where diesel and gasoline are mixed and burnt and a gasoline combustion mode where gasoline only is burnt as combustion modes, and to control a compression ratio variously according to the combustion mode selected during the driving to solve the above-mentioned problems over all driving regions.

In the mixture combustion mode, gasoline is injected to generate a premixture during the intake stroke and diesel for ignition control is injected into the high temperature and high pressure mixture compressed in a combustion chamber to ignite during the compression stroke to carry out the combustion of the diesel-gasoline mixture.

This mixture combustion mode enables to avoid the problems of the existing HCCI combustion, especially is a combustion mode of homogeneous mixture, lean burn, self-ignition ignition to secure combustion control stability by using gasoline as a main fuel to be premixed while directly injecting diesel as an ignition control fuel in which the diesel compression ignition combustion (low fuel ratio) and the gasoline premixture combustion (clean exhaust gas) are mixed.

FIG. 1 is a view illustrating an engine having a diesel-gasoline mixture combustion mode and a combustion cycle in the diesel-gasoline mixture combustion mode. A mixture combustion mode will be described in detail with reference to FIG. 1 as follows.

As illustrated, during the intake stroke where an intake valve 11 is opened and a piston 13 moves down toward a bottom dead point, gasoline is injected through a first injector 14 installed in an intake port 1 of intake manifolds (gasoline PFI) while air introduced into a combustion chamber through the intake port 1 is mixed with the gasoline injected through the first injector 14 in advance.

Then, a mixture in which the premixture introduced through the intake port 1 is mixed with recirculated exhaust gas (exhaust-gas recirculation (EGR) gas) introduced into the combustion chamber by an exhaust-gas recirculation (EGR) device is generated within the combustion chamber, so that homogeneous premixture mood and a combustion condition are established within the combustion chamber.

Next, during a compression stroke (Step 1) where the piston 13 moves up toward a top dead point when the intake valve 11 and an exhaust valve 12 are closed, diesel for ignition is injected through a second injector 15 installed in the combustion chamber so that diesel liquid drops for ignition are distributed in the premixture (a stable ignition source is secured).

Moreover, compression ignition in which a plurality of diesel liquid drops within the premixture are ignited by self under high temperature and high pressure condition is carried out during the compression stroke (Step 2) and the gasoline is ignited by the plurality of self-ignited diesel as an ignition source and flame propagates during the expansion stroke.

During the expansion stroke, main heat is generated by the gasoline premixture and the piston 13 is moved by an explosive force caused by the gasoline premixture combustion to generate a driving power.

Although FIG. 1 omits an exhaust stroke, an exhaust gas is discharged through an exhaust port 2 and an exhaust manifold after the combustion during the exhaust stroke where an exhaust valve 12 is opened and the piston 13 moves up toward the top dead point.

As such, since the ignition is carried out by the diesel drops distributed within the premixture in the mixture combustion mode, it is possible to secure a stable ignition source and to improve unstable ignition and shortcoming on combustion efficiency of the existing gasoline HCCI through the gasoline ignition by the multiple point compression ignitions.

In addition, the main heat and a driving power are generated by the gasoline premixture combustion caused by the diesel compression ignition, the present invention is advantageous in view of clean exhaust gas, excellent response, silence, improved fuel ratio, enhancement of unstable combustion, and high efficiency in comparison to the existing gasoline HCCI and the diesel HCCI.

The gasoline combustion mode employed in the present invention means a gasoline premixture combustion mode by spark ignition in which gasoline is injected through the first injector 14 to introduce air and the premixture into the combustion chamber and which the premixture is ignited to burn by an ignition plug 16 installed in the combustion chamber without injection of diesel during the expansion stroke after the compression.

Since the gasoline combustion mode has a similar combustion cycle as that of the existing gasoline engine, its detailed description will be omitted.

As described above, the present invention employs a gasoline combustion mode by the spark ignition in addition to the diesel-gasoline mixture combustion mode by the compression ignition employed in the existing mixture combustion engine as a combustion mode of an engine and further includes an ignition device having the ignition plug 16 as a hardware for the spark ignition in the gasoline combustion mode because a gasoline fuel feeding system is already provided in the existing mixture combustion engine.

Meanwhile, in the present invention, any one of the mixture combustion mode and the gasoline combustion mode is selected according to a driving state of an engine and a control to perform the selected combustion mode is carried out.

Particularly, in the present invention, a compression ratio is controlled with a value corresponding to the selected combustion mode during the selected combustion mode to improve the problems such as knocking and abnormal ignition over whole driving regions of an engine, so that it is possible to achieve the homogeneous mixture combustion, lean burn, and compressive self-ignition combustion which are improved than the existing mixture combustion.

In order to achieve the present invention, a region to which the mixture combustion mode is applied and a region to which the gasoline combustion mode is applied are preset according to the driving state of an engine and a corresponding combustion mode is selected and determined based on a current driving state information of the engine detected during the driving of the engine at the state when the region is selected according to the driving state.

An RPM of the engine and an engine load that are determined from signals from a driving state detector, that is detected signals from respective sensors of a vehicle or a position information of an accelerator pedal instead of the engine load may be the driving state information to determine the combustion mode.

Figure 2:
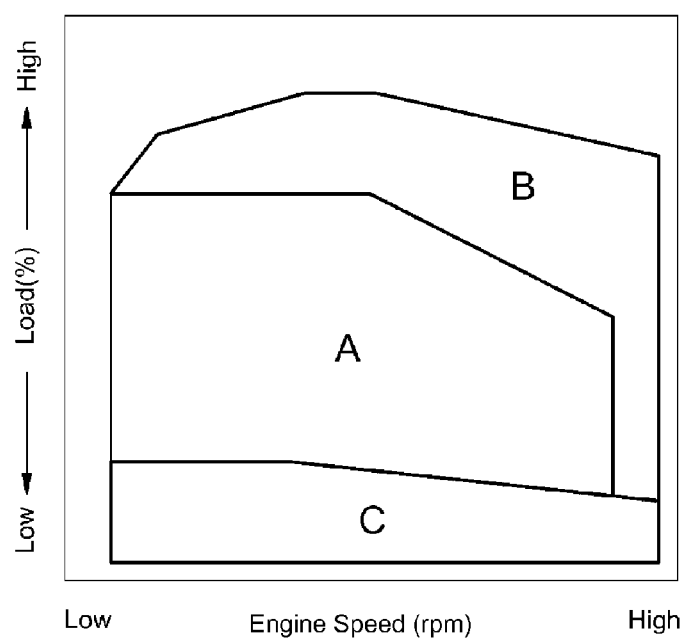
FIG. 2 is a graph illustrating an exemplary map for determining a combustion mode according to the present invention.

FIG. 2 is a graph illustrating an example of a map for determining a combustion mode according to various embodiments of the present invention such as an example of a preset region to which a combustion mode is applied according to the driving state of an engine, in which three regions are set according to the RPM of an engine and the engine load (%).

A symbol 'A' of FIG. 2 set to as a middle region indicates a driving region to which the gasoline premixture combustion and the compression ignition combustion are applied, a symbol 'B' set to as a high load and high speed region indicates a driving region to which the gasoline combustion mode is applied, and a symbol 'C' set to as a low load region indicates a driving region to which the spark ignition combustion mode is applied as a region where unstable combustion may occur when the mixture combustion mode is applied.

For example, the gasoline combustion mode is selected at the high load driving region and the low load driving region of an engine and the mixture combustion mode is selected at the middle driving region so that the combustion in the engine is controlled under the selected combustion mode.

Moreover, the combustion control method according to various embodiments of the present invention further includes controlling a compression ratio varying device based on a selected combustion mode to control a compression ratio variably for the optimized combustion conditions of the gasoline mixture combustion mode and the mixture combustion mode.

In this case, through the compression ratio variable control, the compression ratio is reduced at the gasoline combustion mode while being high at the mixture combustion mode relatively than that at the gasoline combustion mode.

These are obtained by considering different optimal compression conditions between the gasoline combustion mode and the diesel-gasoline mixture combustion mode. In a case of the gasoline combustion mode selected in the high load driving region and the low load driving region, the combustion is preferably carried out under the same compression ratio condition (for example, a compression ratio of 9 to 11) as that a general gasoline engine, while the diesel-gasoline mixture combustion selected in the middle driving region is preferably carried out under the compression ratio condition (for example, a compression ratio of 13 to 14) higher than a boundary condition where the diesel compression ignition is enabled.

Since a desired temperature directly after the compression ignition (for example, 700K) and a compression ratio enabling the diesel compression ignition should be guaranteed in the mixture combustion mode, a minimum compression ratio capable of guaranteeing the diesel compression ignition and higher should be controlled. However, it is preferable to use a compression ratio lower than that the minimum compression ratio for the reduction of knocking in the gasoline combustion mode.

If the compression ratio of a cylinder is fixed high based on the mixture combustion, knocking may occur in the gasoline combustion mode. On the contrary, the compression ratio is fixed low based on the gasoline combustion mode, the diesel compression ignition is impossible in the mixture combustion mode. Thus, the knocking and the unstable compression ignition may be solved over whole driving regions of an engine if a compression variable control may be carried out to satisfy the preferable compression ratio conditions in both of the combustion modes.

Meanwhile, a variable compression ratio (VCR) device, which is installed to an engine to directly change a compression ratio of cylinders continuously in real time, may be used as a device varying a compression ratio according to a combustion mode.

Figure 3:
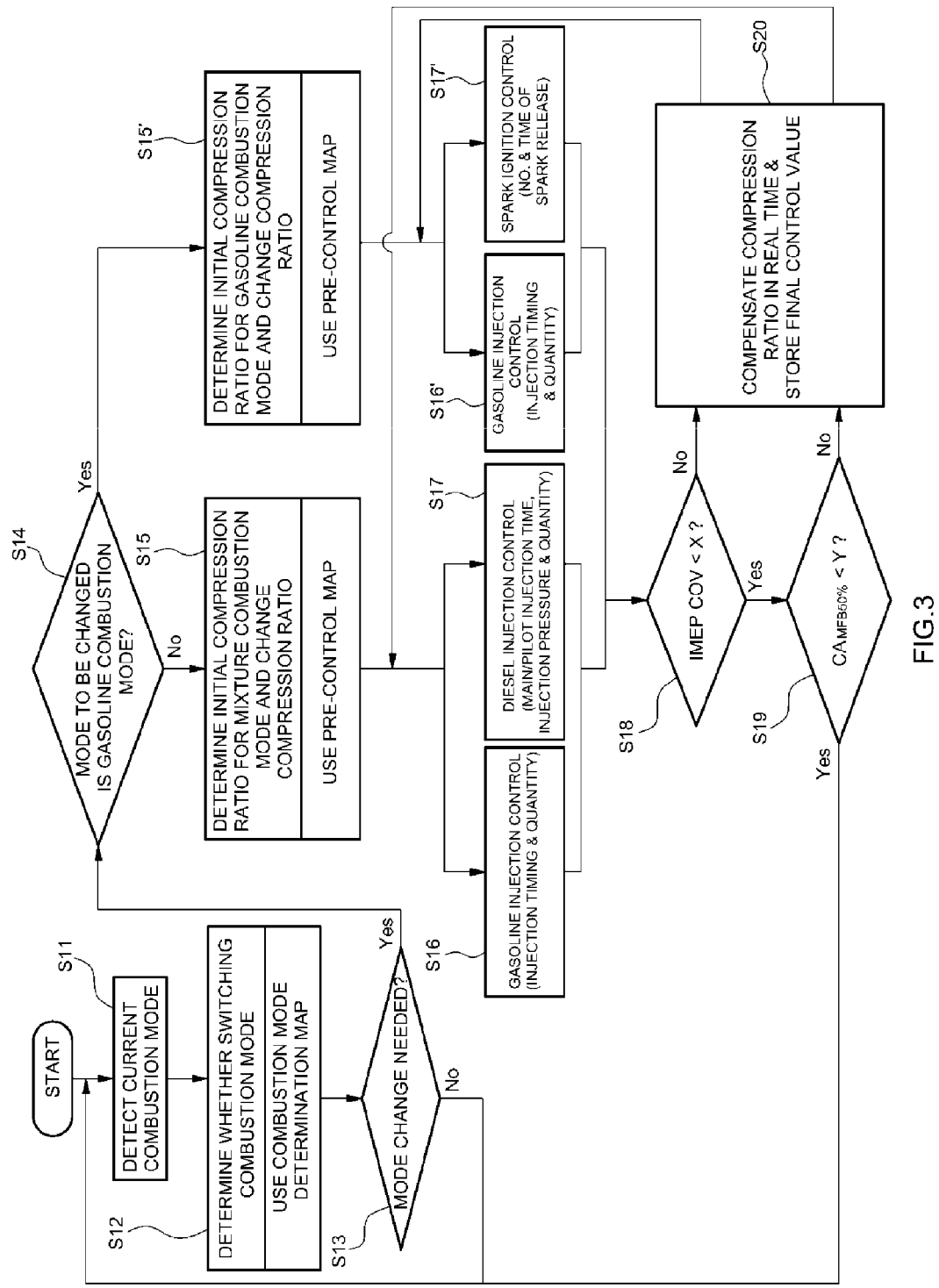
FIG. 3 is a flowchart illustrating an exemplary combustion control method according to the present invention.

FIG. 3 is a flowchart illustrating a combustion control method according to various embodiments of the present invention in which a compression ratio is switched to a value corresponding to a changed combustion mode using a variable compression ratio device when the combustion mode is changed according to a driving state of an engine.

There are devices to vary the compression ratio of cylinders such as a hydraulic variable compression ratio device and an electrical-driven variable compression ratio device, which are installed to an engine. The hydraulic variable compression ratio device using a hydraulic power controls a working hydraulic pressure based on a target hydraulic pressure (a target hydraulic pressure corresponding to a commanded value) so that a compression ratio can reach a determined compression ratio when the compression ratio (the commanded value) is determined.

The method according to various embodiments of the present invention performs a closed loop control in the concept of compensating a compression ratio so that the compression ratio can be firstly controlled to a value corresponding to the combustion mode through the map control and after that the compression ratio is compensated in real time to maintain an optimal compression ratio guaranteeing combustion stability based on a combustion state of an engine fed back during the combustion in the respective combustion modes.

In this case, the combustion state information is obtained from a sensing signal to be feedback and includes a coefficient of variation of indicated mean effective pressure (CoV (IMEP)) indicating combustion stability.

The combustion state information is used to establish an optimal compression condition capable of the combustion stability and the controller performs a control of changing a current compression ratio using the combustion state information obtained from the sensing signal fed back during the combustion in the respective combustion mode when combustion is unstable.

The CoV (IMEP) is measured from a combustion pressure measured by a combustion pressure sensor in the combustion chamber in real time, wherein the combustion pressure varies based on the compression ratio. A case when the CoV (IMEP) calculated from the combustion pressure is higher than an optimal value indicates that a compression ratio is lower or greater than the optical compression ratio so that combustion is unstable, while the lower the CoV (IMEP) is the more stable the combustion is.

In various embodiments, when it is determined that a compression ratio is not suitable based on the CoV (IMEP) during the combustion of the respective combustion modes, a process of correcting a controlled compression ratio to the optimal value is performed by the variable compression ratio device. In a case CoV (IMEP) is excessively greater than a reference value, since the current compression ratio is excessively small and combustion is unstable, a closed loop control of increasing the compression ratio is performed until CoV (IMEP) is less than the reference value.

Since the CoV (IMEP) is a known control factor wide used in combustion control, calculation of the CoV (IMEP) will be omitted.

In addition, the combustion state information may include a crank angle CAMFB50 where a heat release rate caused by the combustion pressure measured by the combustion pressure sensor is 50%.

That is, the present invention employs both the CoV (IMEP) and the CAMFB50 as a reference in determining the combustion stability and the use of them for the determination of the combustion stability is to secure the most basic control device for the combustion stability.

The CAMFB50 is a value of indicating time when 50% of whole fuel (mass fraction burned 50%) is burnt during the combustion in the cylinder by a crank angle and serves as information indicating the combustion stability during the combustion. When the measured CAMFB50 timing of the MFB50% for a cycle (here, CAMFB50% is obtained using combustion pressure information measured by the combustion pressure sensor) is out of a proper range, the combustion may be unstable.

The closed loop control for the change of the compression ratio and the adjustment of the injection time and the quantity of fuel is performed such that the CAMFB50% converses within a preset reference during the combustion of the respective combustion modes.

Since the calculation of the CAMFB50% obtained from the signal of the combustion pressure sensor is already known, its detailed description will be omitted.

Hereinafter, various embodiments, as illustrated in FIG. 3 will be described in detail as follows. In the state when the controller detects or already knows a current combustion mode (S11), the controller determines whether to change the combustion mode based on the current driving state of an engine such as the RPM and the load (a position of an acceleration pedal) of the engine (S12).

In this case, for the determination of changing the combustion mode and of the combustion mode based on the current driving state of an engine, the combustion mode determination map as shown in FIG. 2, that is, a map set by distinguishing the combustion modes according to the RPM and the load of an engine may be used.

When the change of the combustion mode is needed and the needed combustion mode is determined from the map (S13, and S14), a compression ratio corresponding to the determined combustion mode is obtained such that the combustion is carried out under the changed compression ratio.

During this process, the controller determines a compression ratio corresponding to the combustion mode and outputs a control signal for the change of the compression ratio into the determined compression ratio (an initial commanded value) by utilizing a pre-control map stored in advance to control the variable compression ratio device (S15 and S15').

In this case, the pre-control map may be built by mapping a compression ratio according to the driving conditions of an engine such as the RPM and the load (or a position of an acceleration pedal) of an engine. The compression ratio determined by the map becomes a value obtained according to the combustion mode and the current driving state of an engine.

Moreover, a compression ratio in a driving region of an engine corresponding to the mixture combustion mode among the values mapped to the pre-control map is set to a compression ratio higher than the minimum compression ratio where the diesel compression ignition is enabled.

On the contrary, a value of the map in the driving region of an engine corresponding to the gasoline combustion mode is set to a compression ratio lower than that in the mixture combustion mode which is lower than the minimum compression ratio where the diesel compression ignition is enabled.

Consequently, the combustion may occur at the compression ratio corresponding to the changed combustion mode and the current driving state of an engine. For example, it is possible to maintain the compression ratio ranging from 13 to 14 in the mixture combustion mode and from 9 to 1 in the gasoline combustion mode by the variable valve timing control.

For example, when the gasoline combustion mode is switched to the mixture combustion mode, the compression ratio at the gasoline combustion mode and the driving state corresponding thereto is switched to one corresponding to the mixture combustion mode and the current driving state. On the contrary, when the mixture combustion mode is switched to the gasoline combustion mode, the compression ratio at the mixture combustion mode and the driving state corresponding thereto is switched to one corresponding to the gasoline combustion mode and the current driving state.

In addition, when the driving state of an engine is changed although the combustion mode is changed as illustrated in FIG. 3 and the combustion mode is not changed, the compression ratio of cylinders may be variable-controlled continuously by the variable compression ratio device even during the performance of the same combustion mode because the changed compression ratio is obtained from the driving state of an engine.

Then, control of the fuel injection, compression ignition, and spark ignition are performed according to the combustion mode in the state when the compression ratio is changed based on the pre-control map. From a time point when the combustion mode is switched to the mixture combustion mode, the controller controls an injection time and a quantity of gasoline by the first injector based on the signals from the respective sensors of a vehicle for the gasoline injection control and controls the main injection, a pilot time, a pressure, and a quantity of diesel injection by the second injector for the diesel injection control (S16 and S17).

On the contrary, when the combustion mode is switched to the gasoline combustion mode, the controller controls an injection time and a quantity of gasoline by the first injector based on the signals from the respective sensors of a vehicle for the gasoline injection control and controls the number and timing of spark release by ignition plugs for the spark ignition control (S16' and S17').

The controller calculates the CoV (IMEP) from the combustion pressure information (substantial feedback signal is a combustion pressure signal) during the combustion of the respective combustion modes, compares the calculated CoV (IMEP) with a preset reference (S18), and outputs a control signal to increase the compression ratio when the CoV (IMEP) is higher than that the preset reference X.

In this case, the preset reference X is a constant determined in advance by experiments.

Thus, the variable compression ratio device is controlled to change the compression ratio by the control signal from the controller (S20) and the compression ratio is change until the CoV (IMEP) obtained from the combustion pressure signal is less than the preset reference.

As such, the stable combustion is controlled in real time based on the feedback signal and this compensation based on the combustion pressure secures the stability of combustion.

Moreover, CAMFB50% is calculated from the feedback combustion pressure signal from the sensor in real time under the CoV (IMEP) is less than the preset reference, the calculated CAMFB50% (a crank angle where MFB50% is measured, that is, measured CAMFB50%) is compared with the preset reference Y (S19), and the control signal for changing the compression ratio is outputted when the calculated CAMFB50% is larger than the reference Y.

In this case, the reference Y may be determined by an absolute value of a difference between a preset value of a crank angle CAMFB50% and the measured CAMFB50%.

That is, the reference Y may be expressed by 'reference (Y)=ABS (CAMFB50% set value−measured CAMFB50%)' where the CAMFB50% set value is an MFB50% occurring CA constant predetermined by experiments.

Thus, the variable compression ratio device is controlled to change the compression ratio by the control signal from the controller (S20) and the compression ratio is change until the CAMFB50% obtained from the feedback sensor signal is less than the reference.

As such, it is determined whether a set condition for securing the combustion stability is satisfied from the combustion state information of an engine in S18, S19, and S20. If not, the compression ratio is compensated to a value where the combustion stability is guaranteed using the feedback signal during the combustion.

The steps of S18 to S20 are processes of solving the unstable combustion appearing in controlling the compression ratio with only the map value in the respective combustion mode and may be an additional compression ratio control process of compensating the compression ratio to a compression ratio to guarantee the combustion stability, based on the feedback combustion state information after the control of the compression ratio based on the map value.

Final commanded values (final control value of a compression ratio) satisfying the conditions in every steps in S18 and S19 are stored in the pre-control map as new values corresponding to the current driving state of an engine and the corrected map value may be used during the compression ratio control (however, a default value may be used to control at the imitation).

Moreover, in various embodiments as illustrated in FIG. 3, the use of CAMFB50% is described. CAMFB50% indicates the combustion stability like the CoV (IMEP). The CAMFB50% means a stable combustion state when the CAMFB50 is within a proper range but an excessively rapid combustion where the compression ratio is excessively high when the CAMFB50% is lower than the proper range.

Thus, after determining whether the CAMFB50% calculated from the combustion pressure measured in real time is within a preset range, the control may be carried out to increase the compression ratio to secure the stability of combustion because the compression ratio is lower than a proper level and the combustion is delayed when the CAMFB50% exceeds an upper limit, while to lower the compression ratio to secure the stability of combustion because the compression ratio is higher than the proper level and the combustion is unstable when the CAMFB50% is less than a lower limit.

By doing so, the present invention selects the combustion mode according to the driving state of an engine and changes the compression ratio to a compression ratio corresponding to the selected combustion mode so that problems such as knocking and abnormal compression ignition which may occur in an engine with the diesel-gasoline mixture combustion mode and the gasoline combustion mode can be solved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling combustion of an engine having a mixture combustion mode where a mixture combustion of diesel and gasoline is carried out and a gasoline combustion mode where only gasoline is burnt, the method comprising:
    determining a combustion mode according to a current driving state of the engine from the mixture combustion mode and the gasoline combustion mode;
    determining a compression ratio corresponding to the combustion mode according to the current driving state of the engine;
    controlling a variable compression ratio device to control a compression ratio of a cylinder to the determined compression ratio;
    determining whether the combustion state of the engine obtained during the combustion after the control to the compression ratio satisfies a set condition for securing a combustion stability; and
    performing a compression ratio compensation performed by the variable compression ratio device such that the combustion state of the engine satisfies the set condition with taking a combustion pressure sensor signal as a feedback signal when the set condition is not satisfied.

2. The method of claim 1, wherein the determining of the combustion mode comprises:
    detecting the current driving state of the engine; and
    determining a combustion mode corresponding to the current driving state of the engine using a combustion mode termination map in which combustion modes are distinguished according to driving states of the engine.

3. The method of claim 1, wherein the current driving state of the engine comprises an RPM and a load of the engine.

4. The method of claim 1, wherein the variable compression ratio device is controlled such that the compression ratio in the gasoline combustion mode is lower than that of the mixture combustion mode when the mixture combustion mode is switched to the gasoline combustion mode by determining the combustion mode according to the current driving state of the engine.

5. The method of claim 1, wherein the variable compression ratio device is controlled such that the compression ratio in the mixture combustion mode is greater than that of the gasoline combustion mode when the gasoline combustion mode is switched to the mixture combustion mode by determining the combustion mode according to the current driving state of the engine.

6. The method of claim 1, wherein the compression ratio corresponding to a combustion mode is determined to control by the map from engine driving state information comprising the RPM and the load of the engine.

7. The method of claim 6, wherein a final control value of the compression ratio compensated to satisfy the set condition is stored as a new map value corresponding to the current driving state of the engine such that a corrected map value is used after that.

8. The method of claim 1, wherein the combustion state of the engine comprises a coefficient of variation of indicated mean effective pressure (CoV (IMEP)) calculated from a combustion pressure measured by a combustion pressure sensor in real time and the set condition comprises a condition where the CoV (IMEP) is less than a reference (X).

9. The method of claim 8, wherein a compression ratio compensation of increasing the compression ratio is carried out when the CoV (IMEP) is greater than the reference (X).

10. The method of claim 8, wherein the driving state of the engine further comprises a crank angle (CAMFB50%) of mass fraction burned (MFB) 50% obtained from the combustion pressure measured by the combustion pressure sensor and the set condition further comprises a condition when the crank angle (CAMFB50%) is less than a reference (Y),
    wherein, the reference (Y) is set by an absolute value of from the reference (Y)=(CAMFB50% set value−a measured crank angle (CAMFB50%) obtained from the combustion pressure), and
    wherein the CAMFB50% set value comprises a crank angle (CA) constant when a preset MFB50% occurs.

11. The method of claim 8, wherein the driving state of the engine further comprises a crank angle (CAMFB50%) of mass fraction burned (MFB) 50% obtained from the combustion pressure measured by the combustion pressure sensor and the set condition further comprises a condition when the crank angle (CAMFB50%) is within a preset range.

12. The method of claim 11, wherein a correction of increasing the compression ratio is carried out when the crank angle (CAMFB50%) is greater than an upper limit of the set range, while a correction of lowering the compression ratio is carried out when the crank angle (CAMFB50%) is less than a lower limit of the preset range.

13. The method of claim 1, wherein the mixture combustion mode is a combustion mode where the gasoline is injected into an intake port to produce a premixture in which air and the gasoline are mixed with each other during an intake stroke and where diesel for compression ignition is injected into the premixture within a combustion chamber for the compression ignition during a compression stroke.

14. The method of claim 1, wherein the gasoline combustion mode is a spark ignition combustion mode where the gasoline is injected into an intake port to produce a premixture in which air and the gasoline are mixed with each other during an intake stroke and where the premixture is ignited by an ignition plug during an explosive stroke.

15. An apparatus for controlling combustion of an engine having a mixture combustion mode where diesel and gasoline are mixed and burnt and a gasoline combustion mode where the gasoline only is burnt, the apparatus comprising:
- a controller determining a combustion mode from the mixture combustion mode and the gasoline combustion mode according to a current driving state of the engine and outputting a control signal for control of a compression ratio corresponding to the combustion mode according to the current driving state of the engine; and
- a variable compression ratio device changing the compression ratio to a value corresponding to a corresponding combustion mode in response to the control signal from the controller;
- wherein the controller outputs a control signal to compensate the compression ratio with a combustion pressure sensor signal as a feedback signal when the combustion state of the engine obtained during the combustion after control to the compression ratio does not satisfy a preset condition of securing combustion stability.

16. The apparatus of claim 15, wherein the current driving state of the engine comprises an RPM and a load of the engine which are determined by a detection signal from a driving state detector.

17. The apparatus of claim 15, wherein the controller determines a value according to the current driving state of the engine including the RPM and the load of the engine from the map as a compression ratio corresponding to a combustion mode.

18. The apparatus of claim 15, wherein the combustion state of the engine comprises a coefficient of variation of indicated mean effective pressure (CoV (IMEP)) calculated from a combustion pressure measured by a combustion pressure sensor in real time and the set condition comprises a condition where the CoV (IMEP) is less than a reference (X).

19. The apparatus of claim 18, wherein a compression ratio compensation of increasing the compression ratio is carried out when the CoV (IMEP) is greater than the reference (X).

20. The apparatus of claim 18, the driving state of the engine further comprises a crank angle (CAMFB50%) of mass fraction burned (MFB) 50% obtained from the combustion pressure measured by the combustion pressure sensor and the set condition further comprises a condition when the crank angle (CAMFB50%) is less than a reference (Y),
- wherein, the reference (Y) is set by an absolute value of from the reference (Y)=(CAMFB50% set value−a measured crank angle (CAMFB50%) obtained from the combustion pressure), and
- wherein the CAMFB50% set value comprises a crank angle (CA) constant when a preset MFB50% occurs.

21. The apparatus of claim 18, wherein the driving state of the engine further comprises a crank angle (CAMFB50%) of mass fraction burned (MFB) 50% obtained from the combustion pressure measured by the combustion pressure sensor and the set condition further comprises a condition when the crank angle (CAMFB50%) is within a preset range.

22. The apparatus of claim 21, wherein the controller outputs a control signal for a correction of increasing the compression ratio is carried out when the crank angle (CAMFB50%) is greater than an upper limit of the set range and a control signal for a correction of lowering the compression ratio is carried out when the crank angle (CAMFB50%) is less than a lower limit of the preset range.

23. The apparatus of claim 15, wherein the mixture combustion mode is a combustion mode where the gasoline is injected into an intake port to produce a premixture in which air and the gasoline are mixed with each other during an intake stroke and where diesel for compression ignition is injected into the premixture within a combustion chamber for the compression ignition during a compression stroke.

24. The apparatus of claim 15, wherein the gasoline combustion mode is a spark ignition combustion mode where the gasoline is injected into an intake port to produce a premixture in which air and the gasoline are mixed with each other during an intake stroke and where the premixture is ignited by an ignition plug during an explosive stroke.

\* \* \* \* \*